United States Patent [19]

Lapeyre

[11] 4,384,212
[45] * May 17, 1983

[54] APPARATUS FOR STORING THE ENERGY OF OCEAN WAVES

[75] Inventor: James M. Lapeyre, New Orleans, La.

[73] Assignee: The Laitram Corporation, New Orleans, La.

[*] Notice: The portion of the term of this patent subsequent to Jun. 25, 1991, has been disclaimed.

[21] Appl. No.: 147,578

[22] Filed: May 8, 1980

Related U.S. Application Data

[63] Continuation of Ser. No. 687,678, May 19, 1976, which is a continuation of Ser. No. 373,442, Jun. 25, 1973, Pat. No. 3,818,704, which is a continuation-in-part of Ser. No. 148,775, Jun. 1, 1971, abandoned.

[51] Int. Cl.³ .............................................. F03B 13/12
[52] U.S. Cl. ...................................................... 290/53
[58] Field of Search ....................... 290/55, 53; 60/398

[56] References Cited

U.S. PATENT DOCUMENTS 3,484,617 12/1969 Winsel .................................... 290/44
3,818,704 6/1974 Lapeyre ................................ 60/504

Primary Examiner—J. D. Miller
Assistant Examiner—Rebsch D. L.
Attorney, Agent, or Firm—Weingarten, Schurgin & Gagnebin

[57] ABSTRACT

A system is described for manufacturing hydrogen gas which utilizes the energy of surface waves in a liquid, such as an ocean. The system first converts the energy of surface waves to mechanical energy by apparatus comprising a buoyant helical member mounted for rotation about an axis. The pitch of the helical member can be matched to the length of the expected waves and the member is floated on the surface with its axis oriented so that each wave traverses the helix lengthwise and buoyantly supports successive sections thereof causing it to rotate about its axis. The helix is coupled with rotary driven means to an electrical generator, wherein the mechanical energy is converted into electrical energy in the form of DC current which in turn is employed to electrolyze ocean water to produce hydrogen gas which may then be compressed or liquified, e.g. for storage and transportation.

13 Claims, 4 Drawing Figures

APPARATUS FOR STORING THE ENERGY OF OCEAN WAVES

This application is a continuation of my copending application Ser. No. 687,678, filed May 19, 1976, which in turn is a continuation of Ser. No. 373,442, filed June 25, 1973, now U.S. Pat. No. 3,818,704; which is a continuation-in-part of Ser. No. 148,775, filed June 1, 1971, for Apparatus for Storing the Energy of Ocean Waves, now abandoned.

The present invention is concerned with the storage of the energy of surface or gravity waves of the ocean, and particularly to apparatus and methods for converting the energy of ocean waves into compressed or liquified hydrogen.

With the steady depletion of limited natural reserves of fossil fuels such as coal, and more particularly oil and natural gas, it has become increasingly important to find new techniques whereby hitherto large, relatively unused sources of power are tapped or converted. Further such conversion should preferably be to forms compatible with present day equipment that typically combust fuels.

Because it has long been recognized that the ocean represents a tremendous and inexhaustable source of power, a large number of suggestions have been made to tap that power. For example, a number of proposals have been made to harness ocean currents such as those which run in tidal bores. Other proposals have been made to generate electrical power from the thermal differential between the very cold bottom water and sun-heated surface water. However, one of the largest sources of power latent in the oceans, is that provided by surface or gravity waves which represent the net interaction between the ocean and the atmospheric convective forces largely created by the sun.

It has been found that in many sections of the world such as, for example, the west coast of North America, waves approach the coast with great regularity and without interruption over extended periods of time. This has suggested that it might be economically feasible to construct apparatus for converting the available wave energy to a more useful form such as electricity. Other areas are known in which such wave patterns may exist, but unfortunately such areas may be many hundreds of miles from the nearest coast or may be in remote and relatively unpopulated areas of the world. Consequently, conversion of the ocean energy also requires transmission of the converted energy to areas where the power is to be employed.

Waves in water may be termed "gravity waves" and while the waves move horizontally at substantial speeds; e.g., thirty knots, the motion of the water itself is essentially circular or elliptical, except when the wave is caused to break. Wave energy conversion systems employed heretofore have utilized the vertical component of the water motion and/or water movement associated with breaking waves. Such systems are intermittent in their operation and/or have variable energy outputs, while the tremendous wave forces involved, particularly those encountered during storms or as a result of seismic disturbances, have necessitated very substantial and expensive structures.

Another characteristic of ocean waves is their period or wavelength which, over extended periods of time, may, in many locations, deviate only slightly from a particular value. This is significant because it has made possible the achievement of a primary object of the present invention, namely, the provision of a wave energy converter adapted to operate continuously and provide a continuous and substantially constant energy output. In the aforesaid co-pending application Ser. No. 148,775 there is disclosed a wave energy converter that converts the motion of the water of each wave into a torque.

A primary object of the present invention is to provide a system for converting kinetic wave energy into a store of potential energy. A more specific object of the invention is to provide apparatus of the type described adapted to utilize wave energy for producing liquified or compressed hydrogen which can then be readily stored or distributed.

To effect the foregoing and other objects, the present invention generally involves converting wave energy in a body, such as an ocean, into mechanical energy, utilizing apparatus comprising a buoyant helical member mounted for rotation about its helical axis and adapted to be positioned such that the helical axis is oriented approximately along the mean direction of propagation of the waves. The helical member is caused to rotate as the waves traverse the helix lengthwise. The helical member is coupled to an electrical generator wherein the mechanical energy of rotation is converted into electrical energy in the form of DC current. The electrical energy formed is employed to electrolyze ocean water to produce hydrogen gas which may then be liquified or compressed, e.g. for storage and transportation.

Other objects of the invention will, in part, be obvious and will, in part, appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be made to the following detailed description taken in connection with the accompanying drawings wherein.

Figure 1:
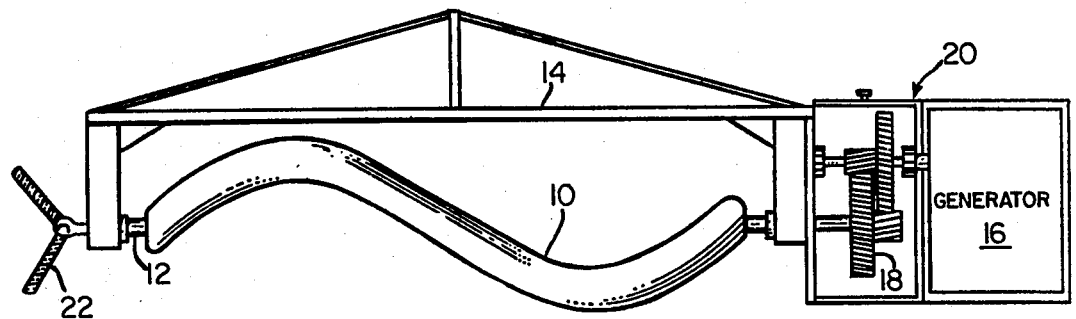
FIG. 1 is a somewhat schematic, elevational view, partially in section, and partially in perspective, illustrating a wave energy converter embodying the invention.

The wave energy converter of the invention is shown in the drawing as comprising means adapted to be rotated directly by ocean waves and power conversion means such as an electrical generator, coupled with the wave rotated means and adapted to be driven thereby. The rotary, wave-driven means include an elongated buoyant member 10 in the form of a helix mounted for rotation about the axis of the helix. Buoyant helical member 10 is constructed so as to displace only a small portion of its volume and may comprise, for example, a tube or it may be formed of a material such as one of the expanded polymers, having a relatively low specific gravity. Member 10 may be self-supporting and rotatably mounted at its ends as shown in FIG. 1 or the helical member, designated 11 in FIG. 2 may be coiled around a supporting shaft 12 and supported at regular intervals throughout its length.

As previously noted, over extended periods of time, the waves approaching a shore may be characterized by a substantially constant period and approach from substantially the same direction. If the period is known or can be predicted accurately, then the wave length and wave velocity are readily computed, being functions of the wave period. For example, it is not unusual to encounter waves having a period of ten seconds which means that the waves travel at a velocity of about thirty knots or fifty feet per second and have a length of the order of five hundred feet. The helical buoyant member 10 is designed to float on the surface of the water with its helical axis oriented in the direction of wave propagation such that each wave traverses the helical member from end to end buoyantly supporting successive sections of the helical member.

Figure 3:
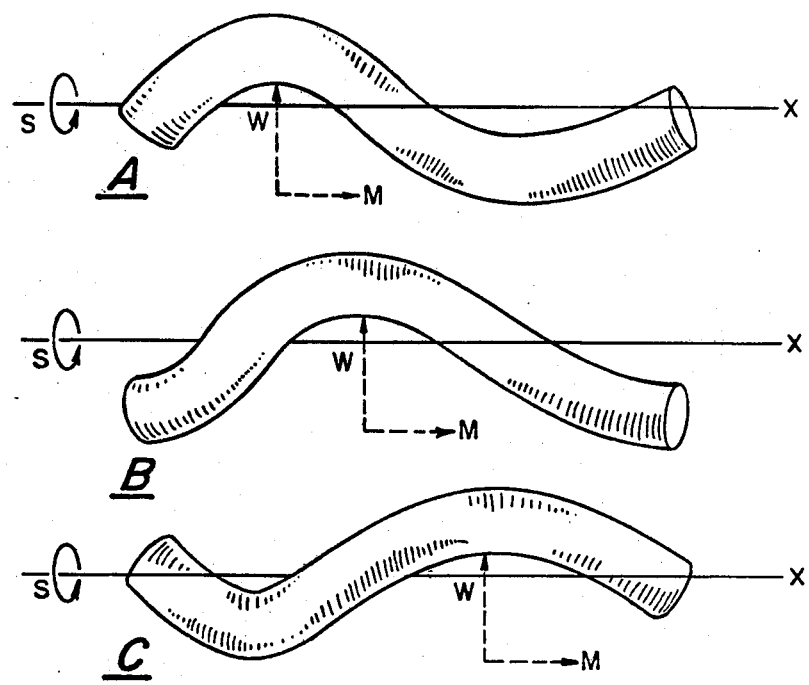
FIG. 3 is a series of views illustrating operation of a buoyant helix of the invention.

In FIG. 3, there are three successive idealized views A, B, and C, of a helix rotated about an axis X by a wave according to the present invention. In each view, the position of the wave crest is indicated by the broken arrow marked W, the direction of wave propagation is indicated by the broken arrow marked M, and the direction of shaft rotation is indicated by the arrow marked S. It should be noted that as the wave crest progresses from left to right successively from the position shown in view A, to that shown in view B, to finally that shown in view C, the motion of the wave along M raises successive portions of the helical member, causing it to rotate about axis X.

In the preferred embodiment of the apparatus of the invention, the pitch (length of a 360° section) of the helix will be at least approximately equal to the length of the expected waves and will be at least 360° in length. By virtue of this construction, rotation of the helical member will be continuous since a wave will start to transverse the helix immediately as the preceding wave has finished transversing the helix and successive waves will act on sections of the helix spaced 360° apart (the pitch length) so that the two lifting forces, converted into torque by the helical member, act simultaneously and in the same direction.

Figure 2:
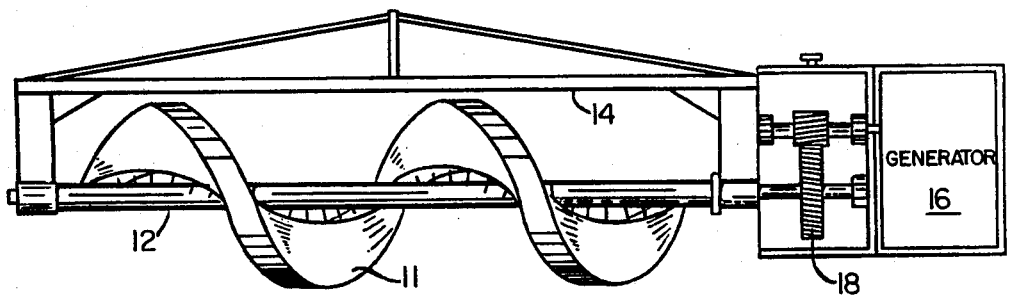
FIG. 2 shows another embodiment of a buoyant helix adapted for incorporation in the apparatus of the invention.

The buoyant helical member may have any convenient cross-section such as circular as shown in FIG. 1, or rectangular as shown in FIG. 2. However, it is important that the helical member have a substantially uniform cross-section or buoyancy, throughout at least 360° of its length so that the torsional component of the force exerted on the helix by each wave remains substantially constant as the wave traverses the helix. In this way, rotation of the helical member will be at substantially constant speed as well as continuous, thus making the apparatus more ideally suited for driving means, such as an electrical generator, required to be driven continuously and at constant speed. The end sections of the helical member may be rounded or tapered to promote smoother flow of the waves as they start and finish traversing the helix.

The other components of the apparatus include means for mounting the helical member for rotation about its axis. These means include a frame or supporting truss 14 in which are journaled shaft section 12 extending from the ends of helical member 10, as shown in FIG. 1, or shaft 12 (shown in FIG. 2) on which helical member 11 is supported.

In an alternative embodiment (not shown), the supporting truss may be eliminated and the helical member mounted for rotation at only one end. For maximum coupling of the helical member to the surface waves, the buoyancy of the helix should be adjusted (by selection of materials, structural weighting or the like) so that in a calm sea, the helical member floats with approximately one-half above water and the other half submerged, the helical axis thus lying in the plane of the water surface. With such a structure, the helical axis will remain at mean water level for waves of substantial amplitude. If the helical member is either so light that it rides almost completely on the wave crests or so heavy that it is substantially neutrally buoyant and rides substantially completely submerged, e.g. just below the wave crests, it will be seen that little or no torque will be produced. The 50% buoyant condition is halfway between these extremes and gives maximum torque and power output.

The driven energy conversion components of the wave energy converter include electrical generator 16 coupled with the helix through a suitable transmission including, for example, speed-up gears 18. The generator should be a unit which is capable of converting the mechanical energy of the helix into electrical energy in the form of d.c. current. Thus generator 16 may be a conventional d.c. current electrical generator, or it may be an a.c. current electrical generator, i.e. a so-called alternator. Obviously, if generator 16 is an alternator, it will also be necessary to include a rectifier to convert the a.c. current into d.c. current. The generator gears are mounted and enclosed in a water-tight, buoyant housing 20 coupled with supporting truss 14 or adapted itself, to function as a support for one end of the helical member. Thus, the helical member, the supporting truss and the driven power generator may be constructed as a buoyant unit that can be moved through the water as any vessel. This permits the converter to be positioned in the most favorable location, oriented as required with respect to the direction of wave travel and moved to a safe place to avoid damage in the event of a storm or other disturbance.

When the pitch of the helical member matches the wave length, the helical member is positioned with its axis parallel with the direction of wave travel. This can be accomplished by providing conventional moorings (not shown) and securing the converter to the moorings by means such as lines 22. The converter may be oriented with either end located toward the source of the waves while housing 20 may be constructed so as to provide minimum interference with wave travel particularly when located toward the source of the waves as would be the case when the housing itself functions as the support for one end of the helical member. Additionally, housing 20 may be provided with suitable ballast, a keel or the like, to prevent axial rotation (capsizing) of the housing and/or to assist in predeterminedly orienting the converter with respect to the direction of the wave travel.

Another advantage of the movable wave energy converter of the invention manifests itself in the situation in which the wave length is less than the pitch of the helical member. In this case, the rotary axis of the helical member can be located at an angle with respect to the direction of wave travel such that the distance between wave crests, measured along the axis of the helix, is equal to the pitch of the helix. In this way, a wave energy converter having a helical member with a fixed pitch may be employed with waves having substantially shorter lengths.

Figure 4:
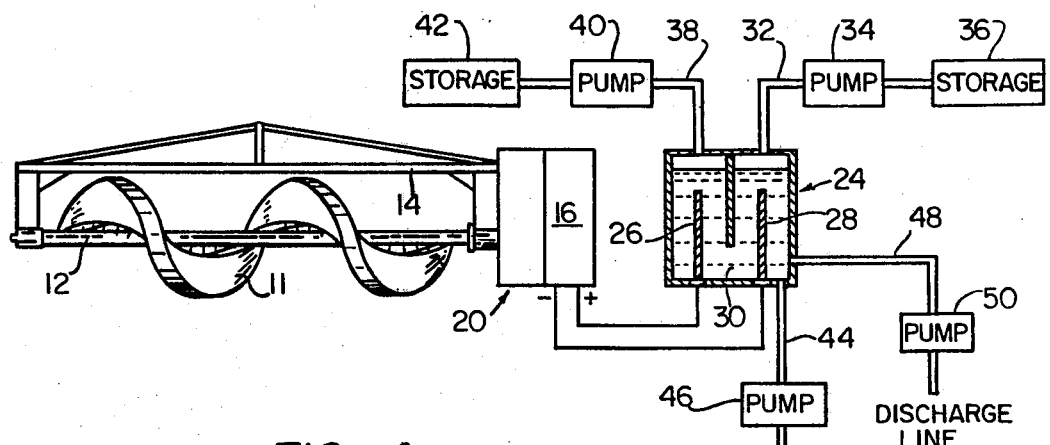
FIG. 4 is a schematic representation showing a system for producing hydrogen gas using the converter of the invention.

The electrical energy produced by generator 16 is used to electrolyze the ocean water to produce hydrogen gas. For example, as shown schematically in FIG. 4, the mchanism, such as is shown in FIG. 2, incldes an electrolytic cell 24 connected electrically to generator 16. Cell 24 is of the type well known in the art for electrolyzing water and includes an anode 26 and a cathode 28.

The electrolytic process consists in passing d.c. electrical current through ocean water 30 at the proper voltage to effect decomposition of sea water according to the following equation:

$$2H_2O \rightarrow 2H_2 \uparrow + O_2 \uparrow \quad (1)$$

Oxygen gas is produced at the anode 26, and hydrogen gas is produced at the cathode 28.

The mechanism also includes collecting means 32 for collecting hydrogen gas produced at the cathode. Connected to means 32 is gas compressing means such as a pump 34 for liquifying or compressing the hydrogen gas to reduce its bulk, and storage means 36 at the discharge end of pump 34. If desired, another gas collecting means 38, pump 40 and storage means 42 can be coupled adjacent anode 26 for collecting and storing oxygen gas produced at the anode. Alternatively, the oxygen gas may be vented to the atmosphere or, if desired, the oxygen gas can be bubbled into the sea water to improve the marine environment.

Cell 24 also includes a sea water intake line 44 in communication with the sea water, and a liquid pump 46. The level of sea water in the cell may be controlled by a float valve or the like (not shown) as will be obvious to one skilled in the art.

As is well known to one skilled in the art, the products of electrolysis will depend on the concentration of various ions in the solution being subjected to the electrolysis, the nature of the electrodes and the applied voltage. By way of example, ocean water comprises an appreciable quantity of chloride ions in solution. Now if an anode comprising platinum is immersed in a body of ocean water, the chloride and hydroxide ions will compete for removal of an electron. Less energy is required to discharge the hydroxyl ion; therefore, for a solution comprising hydroxide ions in excess over chloride ions, practically pure oxygen gas will be evolved, and little chlorine gas. However, when the chloride ions are in substantial excess over the hydroxide ions, a substantial quantity of chlorine gas will be evolved at the anode. For example, in a 2.0 Normal chloride solution, substantially only chlorine gas will be evolved, while in a 0.02 Normal Cl− solution substantially only oxygen gas will be evolved. At intermediate concentrations, a mixture of oxygen and chlorine gas is obtained. Sodium ions may interfer with hydrogen ions in similar manner at the cathode, except that sodium ions will tend to plate out on the cathode, rather than be evolved at a gas. Ocean water typically comprises about 18,980 parts per million by weight of elemental chloride, predominantly in the form of chloride ion. This is only about 0.001 Normal chloride. Sodium ions are also present in about the same concentration as chloride ions; other ions which may also potentially interfer with the electrolysis of water generally are present in ocean water in even smaller concentrations.

Thus it will be seen that by electrolysis of ocean water, the principal products will be hydrogen and oxygen gas which will be evolved at the cathode and at the anode respectively. However, as electrolysis proceeds, the water in the cell 24 will tend to change, and become more concentrated brine. Therefore, in order to avoid a situation where the water being electrolyzed may contain sufficient concentrations of ions which may effectively compete with or interfer with hydrogen and oxygen gas evolution, cell 24 should also include an outlet line 48 and a liquid pump 50 for removing the brine as it is produced in cell 24 and discharging the brine back into the ocean. In actual practice, a steady flow of "fresh" ocean water may be maintained through the cell, although it will be obvious to one skilled in the art, that it may be sufficient merely to periodically flush the cell with fresh ocean water.

Pumps 34, 40, 46 and 50 may be coupled to shaft 12 via suitable transmission means (not shown), or the pumps may be driven utilizing electrical current produced by generator 16.

The electrolysis cell 24, storage means 36 and 42, and pumps 34, 40, 46 and 50, etc. may all be fastened to the converter unit, e.g., by an extension of frame 14 or the like.

The hydrogen and oxygen gas produced at the cathode and anode respectively are typically 99+% pure which makes the gases produced by this invention particularly useful in many industrial applications. For example, the hydrogen gas produced by this invention may be used for hydrogenation of edible oils and the like, or the hydrogen and oxygen gases may be used as fuels in hydrogen-oxygen fuel cells. Preferably, however, the hydrogen gas may be used for its fuel value, i.e. in combustion. Thus it is seen that the instant invention provides a system for changing ocean wave energy into a storable form of energy.

While the wave converter shown and described is designed to float as a unit on the surface, other embodiments including fixed components are considered to fall within the scope of the invention. For example, the supporting truss 14 and/or the housing 20 for the driven power (torque) converter may be buoyed or supported independently of the helical member so that the latter is suspended at its ends at the proper height above the water surface. In embodiments of this type, the supporting truss 14 and/or housing 20 may be mounted so as to be movable only vertically as required to compensate for tide changes and/or variation in wave amplitude. For example, the helical member and/or driven power converter can be mounted on fixed structures mounted on the sea floor and providing for raising and lowering of the helical member as required to position it with a section immersed in the water, or remove it from the water to avoid storm damage. Such fixed structures preferably will also incorporate means for changing the axial direction of the helical member as necessitated by changes in wave direction and length.

The wave energy converter may be constructed essentially as shown, but with a plurality of helical members mounted on the same supporting frame in side-by-side, parallel relation.

It will be apparent from the foregoing description that the wave energy converter of the invention may never be required to withstand the full force of waves as in the case of wave energy converters which cause waves to break, utilize the energy of breaking waves or are located in the region of breaking waves. For this reason and as a result of its mobility, the construction is relatively light and inexpensive as compared with structures which are immobile and, as a result, are subjected to and are designed to withstand severe wave conditions.

The wave converter is responsive to both the horizontal motion of the waves as well as the vertical motion of the water itself so that rotation and energy output are both continuous and substantially constant even though waves arrive at intervals.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for manufacturing hydrogen gas from sea water, said apparatus comprising in combination:
    means for converting the motion of gravity waves in sea water to electrical energy in the form of DC current and including an elongated buoyant member curved about an axis to form a helix of a predetermined pitch, and means for mounting said helical buoyant member for rotation about said axis, said means for mounting including means for suspending said helical buoyant member so as to enable said member to float partially submerged with respect to the crests of said gravity waves, with said axis disposed at an acute angle with respect to the approximate mean direction of propagation of said waves such that the distance between wave crests with respect to said axis is substantially equal to said pitch, and
    means for electrolyzing a quantity of sea water using said electrical energy, to form hydrogen gas.

2. Apparatus as defined in claim 1 wherein said means for converting further comprises:
    generating means coupled with said helical member for rotation thereby in response to rotation of said member so as to produce said electrical energy.

3. Apparatus as defined in claim 2 wherein said electrical energy generating means comprises a DC current generator.

4. Apparatus as defined in claim 2 wherein said generating means comprises an alternator, and a rectifier for converting the output of said alternator to DC current.

5. Apparatus as defined in claim 2 including means for collecting and for compressing said hydrogen gas.

6. Apparatus as defined in claim 5 wherein said means for compressing comprises a pump coupled to said helical member to be driven thereby.

7. Apparatus as defined in claim 5 wherein said means for compressing comprises a pump coupled to said electrical energy means to be driven thereby.

8. Apparatus as defined in claim 1 wherein said means for electrolyzing also forms oxygen gas, and including means for collecting and compressing said oxygen gas.

9. Apparatus as defined in claim 1 wherein said means for electrolyzing comprises an electrolyzing cell, and including means for flowing a quantity of sea water through said cell.

10. Apparatus as defined in claim 9 wherein said means for flowing comprises pump means.

11. Apparatus as defined in claim 10 wherein said pump means are coupled to said electrical energy to be driven thereby.

12. Apparatus as defined in claim 10 wherein said pump means are coupled to said helical member to be driven thereby.

13. Apparatus for manufacturing hydrogen gas from sea water, said apparatus comprising in combination:
    means for converting the motion of gravity waves in sea water to electrical energy in the form of DC current and including an elongated buoyant member curved about an axis to form a helix of a predetermined pitch, and means for mounting said helical buoyant member for rotation about said axis, said means for mounting including means for suspending said helical buoyant member so as to enable said member to float partially submerged with respect to the crests of said gravity waves, with said axis disposed substantially parallel to the approximate mean direction of propagation of said waves such that the distance between wave crests with respect to said axis is substantially equal to said pitch, and
    means for electrolyzing a quantity of sea water using said electrical energy, to form hydrogen gas.

* * * * *